Aug. 12, 1924.
C. W. SPICER
1,504,279
FLEXIBLE COUPLING AND ROLLERS THEREFOR
Filed June 16, 1922
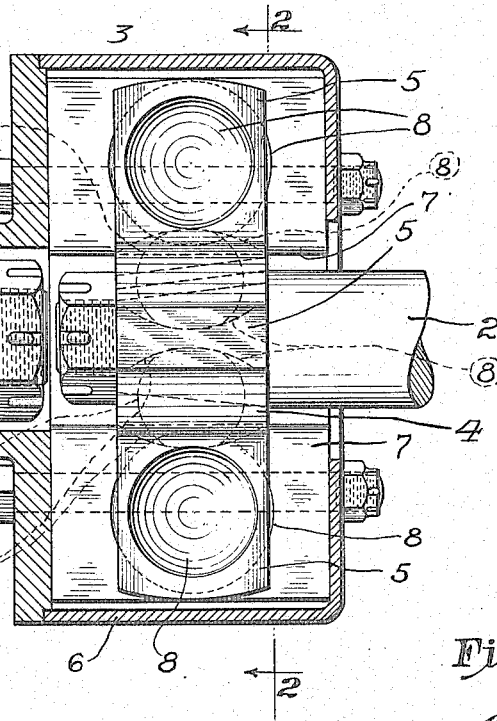
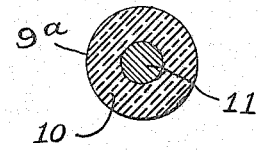
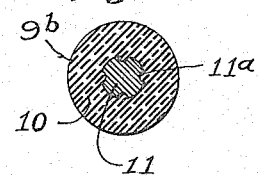
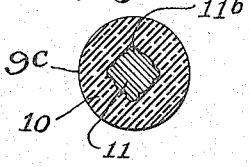
INVENTOR.
C. W. SPICER
BY Sheffield & Betts
ATTORNEYS.

Patented Aug. 12, 1924.

1,504,279

UNITED STATES PATENT OFFICE.

CLARENCE W. SPICER, OF PLAINFIELD, NEW JERSEY, ASSIGNOR TO SPICER MFG. CORPORATION, OF SOUTH PLAINFIELD, NEW JERSEY, A CORPORATION OF NEW JERSEY.

FLEXIBLE COUPLING AND ROLLERS THEREFOR.

Application filed June 16, 1922. Serial No. 568,738.

*To all whom it may concern:*

Be it known that I, CLARENCE W. SPICER, a citizen of the United States, residing in Plainfield, in the county of Union, State of New Jersey, have invented certain new and useful Improvements in Flexible Couplings and Rollers Therefor, of which the following is a complete description.

My invention relates to the art of power transmission.

It has been proposed heretofore to transmit power through a flexible coupling, the driving and driven members of which have elastic rollers interposed therebetween. This arrangement is illustrated in the application of Gurdon L. Tarbox, Serial No. 435,919, filed January 8, 1921, for flexible couplings.

According to my invention the rollers or balls between the driving and driven members of the coupling are not homogeneous, having a highly resilient outer layer overlying an inner layer or layers of increased rigidity and hardness.

The novel features of my invention are pointed out with particularity in the appended claims. The invention itself, however, with its advantages, will best be understood from the following description taken in connection with the accompanying drawing in which—

Fig. 1 is a sectional view, partly in elevation, of a coupling according to my invention, two of the balls being omitted.

Fig. 2 is a sectional view taken on line 2—2 in Fig. 1, parts being shown in elevation.

Figs. 3, 4 and 5 are cross-sections of balls or rollers according to my invention.

Figs. 1 and 2 illustrate apparatus of the type disclosed in said Tarbox application.

In the drawing 1 and 2 are shafts, one of which is a driving member and the other a driven member. Intermediate shafts 1 and 2 is a flexible coupling 3 according to my invention, said coupling comprising a spider 4 having arms 5, 5 extending radially therefrom, and the housing 6 surrounding said arms and having internally projecting segments 7, 7 fixed thereto intermediate said arms. Opposing faces of the arms 5, 5 and segments 7, 7 have therein depressions 8, 8 in which are resilient rollers or balls 9, 9 acting to transmit thrust between the arms 5 and segments 7. The recesses 8 are so formed that the members 9 may roll freely therein but to a limited extent.

The foregoing description applies equally well to the apparatus disclosed in said Tarbox application.

According to my invention, the rollers 9 comprise an external layer 10 of rubber or like highly resilient material surrounding a central core 11 preferably of highly compressed combination of fabric and hard binder or other suitable material having the characteristics of high strength and rigidity.

According to my invention I may interpose between the outer highly resilient layer 10 and the central rigid core 11 a layer 12 whose characteristics are intermediate between those of layer 10 and core 11. Layer 12 may be of rubber, but more highly vulcanized than that of the outer layer 10. Layer 12 may also, if desired, be reinforced by strips of fabric or like material to increase its resistance. By using composite rollers 9 as previously described I obtain, according to my invention, a highly increased capacity for transmitting loads, the resilient layer not only acting as a cushion, but distributing the stresses more uniformly over the harder central load resisting portion than would be the case if the roller were uniformly hard and in direct contact with the members 5 and 7. If uniformly hard rollers or balls were used, contact would be merely along a line or at a point on each side of a given roller.

Fig. 3 illustrates a roller or ball 9$^a$ according to my invention in which the intermediate layer 12 has been omitted.

Fig. 4 illustrates a roller or ball 9$^b$ according to my invention in which the central core 11 is grooved or pitted as indicated at 11$^a$ to increase the grip of part 11 on part 10.

Fig. 5 illustrates a ball or roller 9$^c$ according to my invention in which the central core 11 is provided with projections 11$^b$ which also act to increase the grip of part 11 on part 10.

While I have illustrated my invention as applied to a particular type of flexible coupling, I do not limit myself to this particular type, my invention being equally applicable to other types, one of which is illustrated in the application for flexible couplings Serial No. 484,664, filed July 14, 1921, by myself and the said Gurdon L. Tarbox.

Having thus described my invention, I claim:

1. The combination in a flexible coupling of driving and driven parts, and spherical rolling members intermediate said parts and acting under compression, said members having a resilient outer layer and a core which is hard relatively to said outer layer.

2. The combination in a flexible coupling of driving and driven parts, and spherical resilient rolling members intermediate said parts and acting under compression, said members having an outer layer of rubber and a core which is hard relatively to said outer layer.

3. The combination in a flexible coupling of driving and driven members, and resilient rolling members intermediate said parts and acting under compression, said members having a resilient outer layer, a relatively hard core, and a layer between said layer and core of intermediate hardness.

4. A spherical bearing member for flexible couplings comprising an outer resilient layer and a relatively hard core.

5. A roller for flexible couplings comprising an outer resilient layer, a relatively hard core and a layer between said layer and core harder than said outer layer but softer than said core.

6. A spherical bearing member for flexible couplings comprising an outer layer of resilient rubber, and a relatively strong and hard core.

7. The combination in a flexible coupling of driving and driven parts, and spherical rolling members intermediate said parts and acting under compression, said members having an outer layer of resilient rubber and a relatively hard and relatively strong core.

8. The combination in a flexible coupling of driving and driven parts, and spherical resilient rolling members intermediate said parts and acting under compression, said members having an outer layer of rubber and a core which is hard relatively to said outer layer.

9. A spherical bearing member for flexible couplings comprising an outer resilient layer, a relatively hard core and a layer between said layer and core harder than said outer layer but softer than said core.

CLARENCE W. SPICER.